United States Patent [19]

Chlanda et al.

[11] Patent Number: 5,200,046
[45] Date of Patent: Apr. 6, 1993

[54] APPARATUS AND METHOD FOR ELECTRODIALYTIC TREATMENT OF SALTS TO PRODUCE ACID AND/OR BASE OF IMPROVED PURITY

[75] Inventors: Frederick P. Chlanda, Rockaway; Krishnamurthy N. Mani, Basking Ridge; Yu-Chin Chiao, Bridgewater, all of N.J.

[73] Assignee: Allied-Signal Inc., Morristownship, Morris County, N.J.

[21] Appl. No.: 626,643

[22] Filed: Dec. 12, 1990

[51] Int. Cl.$^5$ ............................................. B01D 61/00
[52] U.S. Cl. .................................. 204/182.4; 204/98; 204/301; 204/182.3
[58] Field of Search ................... 204/182.4, 98, 182.3, 204/296, 301

[56] References Cited

U.S. PATENT DOCUMENTS

| | | | |
|---|---|---|---|
| 2,829,095 | 4/1958 | Oda et al. | 204/98 |
| 3,562,139 | 2/1971 | Leitz | 204/182.5 |
| 3,654,125 | 4/1972 | Leitz | 204/301 |
| 4,024,043 | 5/1977 | Dege et al. | 204/296 |
| 4,082,835 | 4/1978 | Chlanda et al. | 423/242 |
| 4,116,889 | 9/1978 | Chlanda et al. | 521/27 |
| 4,391,680 | 7/1983 | Mani et al. | 204/98 |
| 4,536,269 | 8/1985 | Chlanda et al. | 204/182.4 |
| 4,536,269 | 8/1985 | Chlanda et al. | 204/182.4 |
| 4,608,141 | 8/1986 | Chlanda et al. | 204/182.5 |
| 4,740,281 | 4/1988 | Chlanda et al. | 204/151 |
| 4,766,161 | 8/1988 | Chlanda et al. | 521/27 |
| 4,806,219 | 2/1989 | Yamamoto et al. | 204/182.4 |
| 4,976,838 | 12/1990 | Mani et al. | 204/182.3 |

FOREIGN PATENT DOCUMENTS

| | | |
|---|---|---|
| 0124007 | 11/1984 | European Pat. Off. |
| 9006167 | 6/1990 | World Int. Prop. O. |
| 9006168 | 6/1990 | World Int. Prop. O. |

OTHER PUBLICATIONS

Co-Ion Transport in Bipolar Membranes, Thomas A. Davis Graver Water Div. Union, NJ.
Water Splitting Efficiency of Bipolar Membranes, New Membrane Materials & Processes for Sep. KK Sirkar Dr Lloyd Eds. AICHE Symposia 261 (1988).

*Primary Examiner*—John Niebling
*Assistant Examiner*—Arun S. Phasge
*Attorney, Agent, or Firm*—Karen A. Harding; Jay P. Friedenson

[57] ABSTRACT

The present invention relates to a method and related apparatus useful to electrodialytically convert salt to acid and/or base of improved purity. The apparatus comprises an electrodialytic water splitting apparatus comprised of at least one unit cell. Each cell comprises at least two means for splitting water. An intermediate compartment is between the two adjacent means for splitting water. At least one ion selective means is adjacent to at least one of the means for splitting water. An acid or base product compartment is between the ion selective means and the means for splitting water. There is an aqueous salt feed compartment, the ion selective means being between the salt feed compartment and the water splitting means.

24 Claims, 6 Drawing Sheets

APPARATUS AND METHOD FOR ELECTRODIALYTIC TREATMENT OF SALTS TO PRODUCE ACID AND/OR BASE OF IMPROVED PURITY

This invention relates to an improved apparatus and method for electrodialysis of salts to form acid and/or base with improved purity. More particularly; the invention is an apparatus and related method based on electrodialytic cells comprising at least two means for splitting water in series.

BACKGROUND OF THE INVENTION

Electrodialysis uses direct current as a means to cause the movement of ions in solutions. Electrodialysis processes are well known in the art and are typically carried out in a stack arrangement comprising a plurality of flat sheet membranes. The stack consists of electrodes (anode and cathode) at either end and a series of membranes and gaskets which are open in the middle to form a multiplicity of compartments separated by the membranes. Usually, a separate solution is supplied to the compartments containing the electrodes. Special membranes may be placed next to the electrode containing compartments in order to prevent mixing of the process streams with the electrode streams. The majority of the stack between the electrode compartments comprises a repeating series of units of different membranes with solution compartments between adjacent membranes. This repeating unit is called the unit cell, or simply, a cell. Solution is typically supplied to the compartments by internal manifolds formed as part of the gaskets or by a combination of internal and external manifolds. The stacks can include more than one type of unit cell. Streams may be fed from one stack to another in order to optimize process efficiency. Usually the change in composition of a stream after one pass through the stack is relatively small and the solutions can be recycled by being pumped to and from recycle tanks. Addition of fresh solution to and withdrawal of product from the recycle loop can be made either continuously or periodically in order to control the concentration of products in a desired range.

Treatment of aqueous salt streams by electrodialysis to form acid and/or base from the salt is known. The aqueous salt stream is fed to an electrodialytic water splitting apparatus which comprises an electrodialysis stack and a means for electrodialytically splitting water. The electrodialytic splitting of water is distinct from electrolytic water splitting. The former process only separates the $H^+$ and $OH^-$ ions of the water molecule while the latter process which occurs at the surface of electrodes is accompanied by other reactions involving oxidation and reduction. A useful apparatus is disclosed in U.S. Pat. No. 4,740,281. A useful means to split water to ($H^+$) and ($OH^-$) is a bipolar membrane such as disclosed in U.S. Pat. No. 4,766,161. The bipolar membrane is comprised of anion selective and cation selective layers of ion exchange material In order for the membrane to function as a water splitter, the layers must be arranged so that the anion layer of each membrane is closer to the anode than the cation layer. A direct current passed through the membrane in this configuration will cause water splitting with hydroxyl ions being produced on the anode side and a corresponding number of hydrogen ions being produced on the cathode side of the membrane.

Electrodialytic water-splitting in a two-compartment cell has been disclosed, for example, in U.S. Pat. No. 4,391,680 relating to the generation of strongly acidified sodium chloride and aqueous sodium hydroxide from aqueous sodium chloride U.S. Pat. No. 4,608,141 discloses a multi-chamber two-compartment electrodialytic water splitter and a method for using the same for basification of aqueous soluble salts. U.S. Pat. No. 4,536,269 disclose a multi-chamber two-compartment electrodialytic water splitter and a method for using the same for acidification of aqueous soluble salts. These two patents review the use of two-compartment electrodialytic water splitters to treat salts.

Three-compartment electrodialytic water splitters are disclosed to be comprised of alternating bipolar, anion and cation-exchange membranes thereby forming alternating acid, salt and base compartments (S/B). U.S. Ser. No. 135,562 discloses three-compartment electrodialytic water splitters. U.S. Pat. No. 4,740,281 discloses the recovery of acids from materials comprising acid and salt using an electrodialysis apparatus to concentrate the acid followed by the use of an electrodialytic three-compartment water splitter to separate the acid from the salt.

U.S. Pat. No. 4,806,219 discloses a three-compartment electrodialysis cell in which there is a special ion-exchange membrane to form an acid and alkali at high acid concentrations at a high current efficiency. The electrodialysis cell consists of two types of bipolar membranes and an anion exchange membrane. One bipolar membrane is a high cation-exchange group bipolar membrane and the second is a neutral bipolar membrane The equivalent ratio of anion exchange group to cation-exchange group in the high cation-exchange membrane is from 0.01 to 0.05 and preferably from 0.05 to 0.3. The second bipolar membrane is a neutral bipolar membrane having an equivalent ratio of anion exchange group to cation-exchange group of from 0.6:1 to 1.0:0.6, preferably from 0.9:1 to 1:0.9. The high cation bipolar membrane is disclosed to be used in place of a cation membrane. The high cation bipolar membrane functions to permit the cations to migrate upon application of a direct current to the cell. The high cation bipolar membrane is not disclosed to electrodialytically split water. Water is split at the neutral bipolar membrane.

Figure 1:
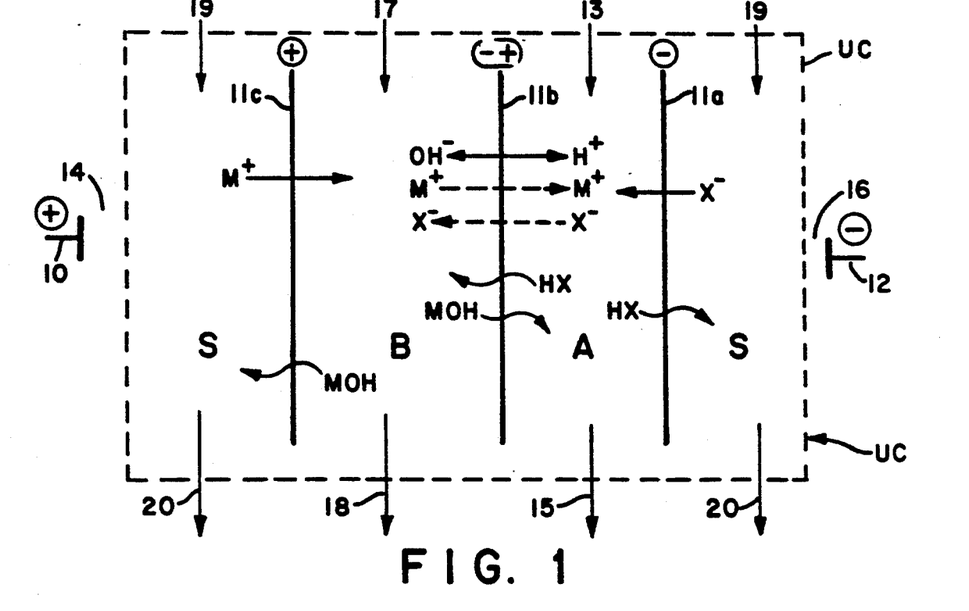
FIG. 1 is a schematic drawing of a prior art unit cell illustrating ion leakage.

The purity of the acids and bases produced from salts by water-splitting is sometimes inadequate. A major source of contamination of the acid and base results of the transport of anions from the acid to the base and cations from the base to the acid. These processes are described in Sirkar et al., Editors, *New Membrane Materials and Processes for Separation*; Chlanda et al., *Water Splitting Efficiency of Bipolar Membranes*, AIChE Symposium Series 1988 and the presentation of T. A. Davis, "*Coion Transport in Bipolar Membranes*", American Chemical Society, 1986 Southwest Regional Meeting, Nov. 20, 1986. The problem becomes even more severe when weakly ionized acids and bases are being produced. These transport processes which result in contamination of the acid and/or base are illustrated in FIG. 1.

Means to purify acids and bases by the use of bipolar membranes have been described in U.S. application Ser. No. 278,062, filed Dec. 1, 1988, and U.S. Pat. No. 4,976,838. These processes are general to acids and bases obtained from any sources, including the water-splitting operation.

SUMMARY OF THE INVENTION

The present invention relates to a method and related apparatus useful to electrodialytically convert salt to acid and/or base of improved purity. Electrodialytic means for splitting water, such as a bipolar membrane, even when they are highly efficient splitters of water, allow some migration (leakage) of salt forming ions into the acid and/or base product areas (i.e., compartments). The apparatus and method of the present invention minimizes such leakage. The unit cells in the various embodiments of the present invention are repeating units in series between electrodes. Within each unit cell there are different membranes with solution compartments between adjacent membranes. The beginning and end of a unit cell is arbitrarily chosen to facilitate the understanding of the present invention. The repetition of the units substantially characterize the whole membrane/compartment stack between electrode compartments. For the present purposes, the unit cells serially start and end in salt feed compartments, including at least a portion of salt feed compartments at each end as described below and illustrated in the drawings.

The apparatus comprises an electrodialytic water splitting apparatus comprised of at least one and preferably at least two unit cells. Each cell comprises at least two means for splitting water serially aligned (in series). There is a first and last means to split water in series in each cell. An intermediate compartment is between the two adjacent means for splitting water. At least one ion selective membrane is adjacent to at least one of the means for splitting water. An acid or base product compartment is between the ion selective membrane and the means for splitting water. There is an aqueous salt feed compartment, the ion selective membrane being between the salt feed compartment and the water splitting means. Preferably, there are at least two cells in series with an aqueous salt solution feed compartment between adjacent cells. There is a suitable means to provide an electrical potential across the cells.

The ion selective membrane is preferably an anion exchange membrane and/or a cation-exchange membrane. The means for splitting water is preferably a bipolar membrane capable of splitting water. Preferably, there are two or three adjacent bipolar membranes in series, with two bipolar membranes in series being most preferred.

In a preferred apparatus to produce an acid or base solution with improved purity the cell has a cation selective membrane closest to the anode. The ion selective member closest to the cathode is an anion selective membrane adjacent to a last means for splitting water. There is acid product compartment between said anion selective membrane and the last means for splitting water. Preferably, the means for splitting water are two adjacent bipolar membranes. A base product compartment is between the cation selective membrane and a first bipolar membrane, and an acid product compartment is between the anion selective membrane and a second bipolar membrane. There is an intermediate compartment between the two adjacent bipolar membranes. There is a salt feed compartment adjacent to the anion selective membrane on the side opposite the acid compartment (A); and a salt feed compartment adjacent to the cation selective membrane on the side opposite the base compartment (B).

The present invention also includes a method of electrodialytically treating aqueous salt solutions to generate acids and/or bases having improved purity. The method comprises feeding an aqueous salt solution to an apparatus of the type recited above having at least two adjacent means for splitting water in series. The intermediate compartment between adjacent bipolar membranes is a sink or barrier for undesirable ions leaking from the salt feed compartment, i.e., cations into the acid product compartment or anions into the base product compartment. Ions leaking into the intermediate compartment can be treated, or removed.

A method for generating acid having improved purity from an aqueous salt solution, comprises the steps of feeding the aqueous salt solution to an electrodialytic apparatus comprising at least two adjacent means for splitting water, there being an intermediate acid compartment (IAC) between adjacent means. At least one anion selective membrane is adjacent to the means for splitting water nearest the cathode. An acid product compartment is between the anion selective membrane and the means for splitting water, and a salt feed compartment is adjacent to the anion selective means on the side opposite the acid product compartment. The aqueous salt solutions are fed to the salt feed compartments. An aqueous stream, preferably comprising an acid, is fed to the intermediate acid compartment (IAC). An aqueous stream is fed to the acid product compartment. A sufficient electrical potential is applied across the cells to cause introduction of $H^+$ from the means for splitting water into the acid product compartment, and transport of anions from the salt feed compartment into the acid product compartment to form acid in the product compartment. The acid is removed from the product compartment; and the intermediate acid product is removed from the intermediate compartment. Cations leaking from the compartment adjacent to the bipolar membrane closest to the anode toward the cathode are collected in the intermediate acid compartment (IAC) for removal.

A method for generating base having improved purity from an aqueous salt solution, comprises the steps of feeding the aqueous salt solution to an electrodialytic apparatus comprising at least two adjacent means for splitting water, there being an intermediate base compartment (IBC) between adjacent means. At least one cation selective membrane is adjacent to the means for splitting water nearest the anode, there being a base product compartment between said cation selective means and the means for splitting water, and a salt feed compartment adjacent to the cation selective means opposite the base product compartment. The aqueous salt solutions are fed to the salt feed compartments. An aqueous stream preferably comprising a base is fed to the intermediate base compartment (IBC). An aqueous stream is fed to the product base compartment (B). A sufficient electrical potential is applied across the cells to cause introduction of $(OH^-)$ from the means for splitting water into the product base compartment (B), and transport of cations from the salt feed compartment into the product base compartment (B) to form base in the product compartment. The base is removed from the base product compartment; and the intermediate base product is removed from the intermediate compartment. Anions leaking from the compartment adjacent to the means for splitting water closest to the cathode toward the anode are collected in the intermediate base compartment (IBC) for removal.

Similarly, by using a unit cell having three bipolar membranes in series, in combination with at least one anion selective means adjacent to a first means for splitting water, and at least one cation selective means adjacent to a last bipolar membrane in series, both acid and base having improved purity can be generated.

BRIEF DESCRIPTION OF THE DRAWINGS

Corresponding elements in different Figures have the same reference characters, plus a multiple of 100, unless indicated otherwise.

In the Figures the following transport convention was used. Major (desired) transport is indicated by a solid arrow; minor (undesired) transport of ions is indicated by dashed arrows; and diffusion of neutral material (not resulting in current) by wavy arrows.

DESCRIPTION OF THE PREFERRED EMBODIMENTS

The present invention will be understood by those skilled in the art by reference to the accompanying Figures.

FIG. 1 is a prior art three-compartment unit cell illustrating ion leakage. The three-compartment electrodialytic water splitter shown in FIG. 1 is used to recover and regenerate acid and base from salt solutions. The water splitter comprises, in series, an anode 10 (e.g., a platinum anode); an anolyte compartment 14; repeating in series salt (S); base (B); and acid (A) compartments; a catholyte compartment 16; and a cathode 12 (e.g., a platinum cathode). The acid, base and salt compartments of the three-compartment water splitter illustrated in FIG. 1 are defined by a plurality of serially arranged membranes as follows: an anion permselective membrane 11a, a bipolar membrane 11b, and a cation permselective membrane 11c. Although FIG. 1 shows four serially arranged compartments, the three-compartment electrodialytic water splitters are defined by a plurality of unit cells, each unit cell (UC) comprising a cation membrane, a bipolar membrane (or equivalent structure capable of splitting water into hydrogen and hydroxyl ions), and an anion membrane.

The anolyte and catholyte compartments typically contain a base, salt, or acid solution (e.g., KOH, $Na_2SO_4$, or $H_2SO_4$), the acid (A) and base (B) compartments initially contain a liquid comprising water, added via lines 13 and 17, respectively, salt (S) compartment initially contains a salt solution, comprising a salt MX of a cation ($M^+$) and an anion ($X^-$), added via line 19. The designation ($X^-$) refers not only to monovalent anions but also to divalent anions, such as sulfates, and trivalent anions, such as phosphates, and mixtures thereof. Splitting of the salt into acid and base commences by applying an electrical potential between the electrodes causing a direct current.

In the acid compartment (A) which is supplied with a liquid comprising water and preferably an acid, hydrogen ions ($H^+$) are added via the function of the bipolar membrane 11b. Simultaneously, anions ($X^-$) of the salt are transported across the anion membrane 11a into the acid compartment (A). The combination of the hydrogen ions with the anions yields an acid product (HX).

Cations ($M^+$) pass from salt compartment (S) through the cation membrane 11c to the base (B) compartment In the base compartments (B), cations ($M^+$) migrating through the cation membrane 11c combine with the hydroxyl ions ($OH^-$) generated by the bipolar membrane 11b to produce a basified (MOH) solution.

The acid product is removed from compartment (A) via line 15, the base product from base compartment (B) is removed via line 18, and the depleted salt solution from salt compartment (S) is removed via line 20. The electrodialytic water splitter can be operated in a batch mode, a continuous mode, or variations thereof. Product solutions or portions thereof may be recycled for further concentration.

A major source of impurities in the product acid and base is the transport of anions ($X^-$) and acid (HX) across the bipolar membrane to the base compartment (B); and the transport of cations ($M^+$) and base (MOH) across the bipolar membrane to the acid compartment (A). The somewhat imperfect selectivity of the bipolar membrane results in contamination of both the acid and base products with salt.

The amount of contamination depends on the properties of the bipolar membrane, the products being produced, and the operating conditions of the water splitter. Temperature and especially current density may be adjusted to obtain higher purity acid and base. The contamination levels generally are lower when lower temperatures and higher current density are used. The flux of contaminating species also depends strongly on the concentration of the contaminating species in the adjacent compartment. For example, in producing HCl and NaOH from NaCl, the amount of chloride found in the base will increase as the concentration of HCl in the acid increases and the amount of sodium in the acid will be higher when the NaOH concentration in the base is higher. Control of the product concentrations by adding a diluent or in the case of volatile acids and bases by stripping is another means of controlling the level of contamination. However, there is a limit to which these methods can be practiced. For example, high product (acid and base) concentrations are often required, cooling of solutions to low temperatures is expensive, and high current density results in higher energy consumption, concentration polarization, and frequently shorter membrane life.

The present invention includes a method and related apparatus useful to electrodialytically convert salt to acid and/or base of improved purity. The unit cell of the apparatus comprises at least two adjacent water splitting means, preferably bipolar membranes in series, with an intermediate compartment between adjacent bipolar membranes. The intermediate compartment provides a means of controlling the concentration of the potentially contaminating species next to the acid and/or base product compartments. Because the intermediate compartment is between bipolar membranes, most of the ion transport into the compartment consists of entry of hydrogen and hydroxyl ions. These react to form water. Therefore, the ionic composition of the solution changes relatively slowly and it is not necessary to replenish it at a high rate to maintain its composition in a desirable range. The solution introduced to the intermediate compartment can contain an electrolyte of a type and at a concentration such that there is less transport (leakage) of cations (M+) across the bipolar membranes bounding the acid compartments (A) if pure acid is being produced; and/or less transport (leakage) of anions (X−) across bipolar membranes bounding the base compartments (B) if pure base is being produced. The average composition of solutions within the cell is determined primarily by the influent composition and flow rate, the current density, residence time in the cell and the transport properties of the membranes. It can be estimated readily by one skilled in the art or determined by routine experimentation. Thus, process control can be obtained by control of influent composition and flow rates.

When pure base (a base containing a low level of anions other than hydroxide) is being produced, the electrolyte in the intermediate compartment is preferably a base; and when pure acid (an acid containing a low level of cations other than hydrogen ion) is being produced, the electrolyte in the intermediate compartment is preferably an acid. While the use of acid and base in the intermediate compartments is preferred, salts, especially at low concentration, can be used. The concentration of the electrolyte used in the intermediate compartment affects the product purity. The use of a relatively low concentration can be advantageous in producing simultaneously base and acid of improved purity with only a single intermediate compartment.

The concentration of acid or base in the intermediate compartment is preferably lower than that in the acid or base product compartments, respectively. Typically, the concentration of acid, base, or salt in the intermediate compartment is less than 5 weight percent, and preferably from 1 to 3 weight percent. For example, in a cell producing 15 weight percent NaOH and 5 weight percent HCl, the use of 2 weight percent NaOH in the intermediate compartment will improve the purity of the base since the anion concentration (other than hydroxide) is low and will also improve the purity of the acid because the sodium concentration is lower than in the 15% NaOH product, which would normally be adjacent to the acid. Salts (or acids or bases) can be used in the intermediate compartment, which contain ions, which are not as undesirable as impurities. For Example, HCl could be used in NaF splitting to reduce the amount of fluoride in the NaOH produced and thus minimize the precipitation of sparingly soluble NaF.

In any of these embodiments, the solution in the intermediate compartments will become contaminated with the ion being trapped and will need to be replenished at a rate dictated by the requirements for purity and process economics. Product purity will be roughly proportional to the concentration of the impurity in the intermediate compartment. A reduction in impurity levels of the product of 2-10 times are believed to be able to be achieved easily with greater improvements possible.

A portion of the pure product can be used as a feed to the intermediate compartments and the product of those compartments can still be used for its acid or base value where high purity is not of as much concern. Alternatively, the product of the intermediate compartments can be recycled or purified, e.g., by the methods disclosed in U.S. Ser. No. 278,062 and U.S. Pat. No. 4,976,838 or other methods known in the art.

Figure 2:
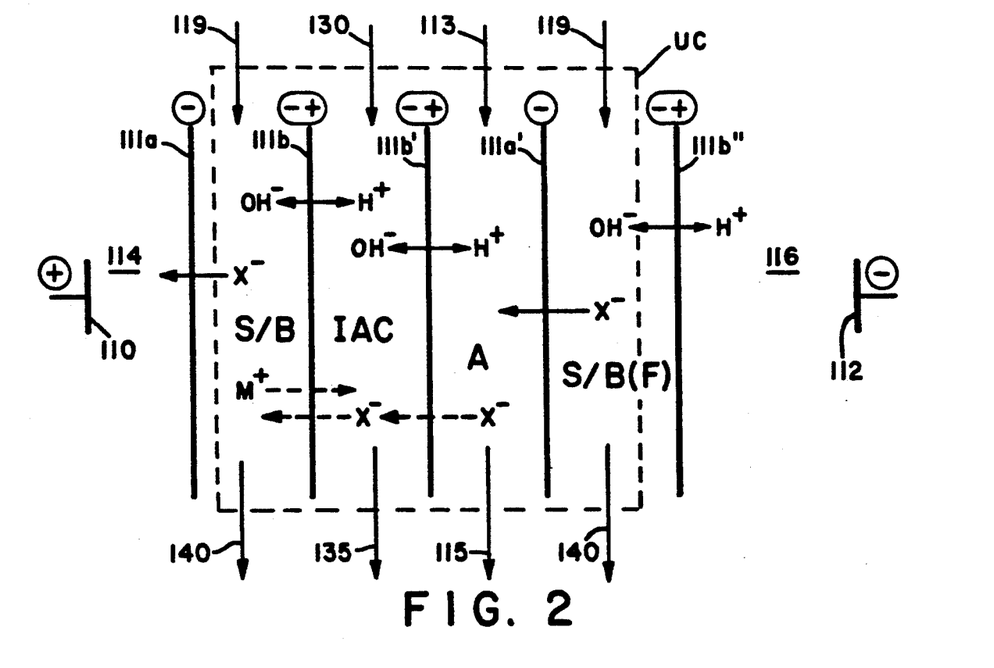
FIG. 2 is a schematic drawing of a unit cell of the present invention useful for generating acid with improved purity.

FIG. 2 schematically illustrates a preferred embodiment of the present invention useful for electrodialytically converting salt to acid of improved purity. The apparatus comprises at least one unit cell (UC) comprising at least two adjacent means for splitting water, preferably bipolar membranes 111$b$ and 111$b'$. There is an intermediate acid compartment (IAC) between the two adjacent bipolar membranes. FIG. 2 also includes components from adjacent unit cells. Each unit cell (UC) comprises at least one ion selective membrane, such as anion membrane 111$a'$ adjacent the means for splitting water nearest the cathode, i.e., bipolar membrane 111$b'$. The bipolar membranes 111$b$ and 111$b'$ each have a cation selective surface layer (+) and an anion selective surface layer (−). The two bipolar membranes are positioned so that the anion selective surfaces face the anode 110, and the cation selective surfaces face the cathode 112. There is an acid product compartment (A) between the cation selective surface (+) of bipolar membrane 111$b'$ and anion selective membrane 111$a'$. There are salt/base (S/B) compartments between the anion selective surface (−) of bipolar membranes 111$b$ and 111$b''$ and anion membranes 111$a$ and 111$a'$ respectively.

A salt feed stream 119 passes into the salt/base (S/B) compartments. An aqueous fluid is added via line 113 to acid compartment (A). An aqueous stream preferably comprising an acid is fed via stream 130 into intermediate acid compartment (IAC). When an electric field is applied across the cell via the anode and cathode, water is split at the bipolar membranes resulting in (H+) entering the intermediate acid compartment (IAC) and the acid compartment (A). Hydroxyl ions (OH−) formed at the bipolar membranes enter the intermediate acid compartment (IAC) and the salt/base compartment (S/B). To the extent that (H+) and (OH−) are introduced into the (IAC) compartment in equal amounts, water is formed by their reaction. Anions (X−) migrate across the anion membranes towards the anode. The anion layer (−) of the bipolar membrane 111$b$ is not perfectly selective, so some cations (M+) leak from the (S/B) compartment across a first bipolar membrane 111$b$ and enter into intermediate acid compartment (IAC) before they can enter acid product compartment (A). The addition of cation (M+) to the (IAC) results in a buildup of (M+) in that compartment which is controlled by composition (i.e., the presence of acid) and/or withdrawing solution. The composition and the flow rate of the feed stream 130 can be controlled to minimize the transport of cations (M+) across subsequent bipolar membrane 111$b'$ to acid product compartment (A). Basified salt is removed via line 140 and pure acid is removed via line 115.

Figure 3:
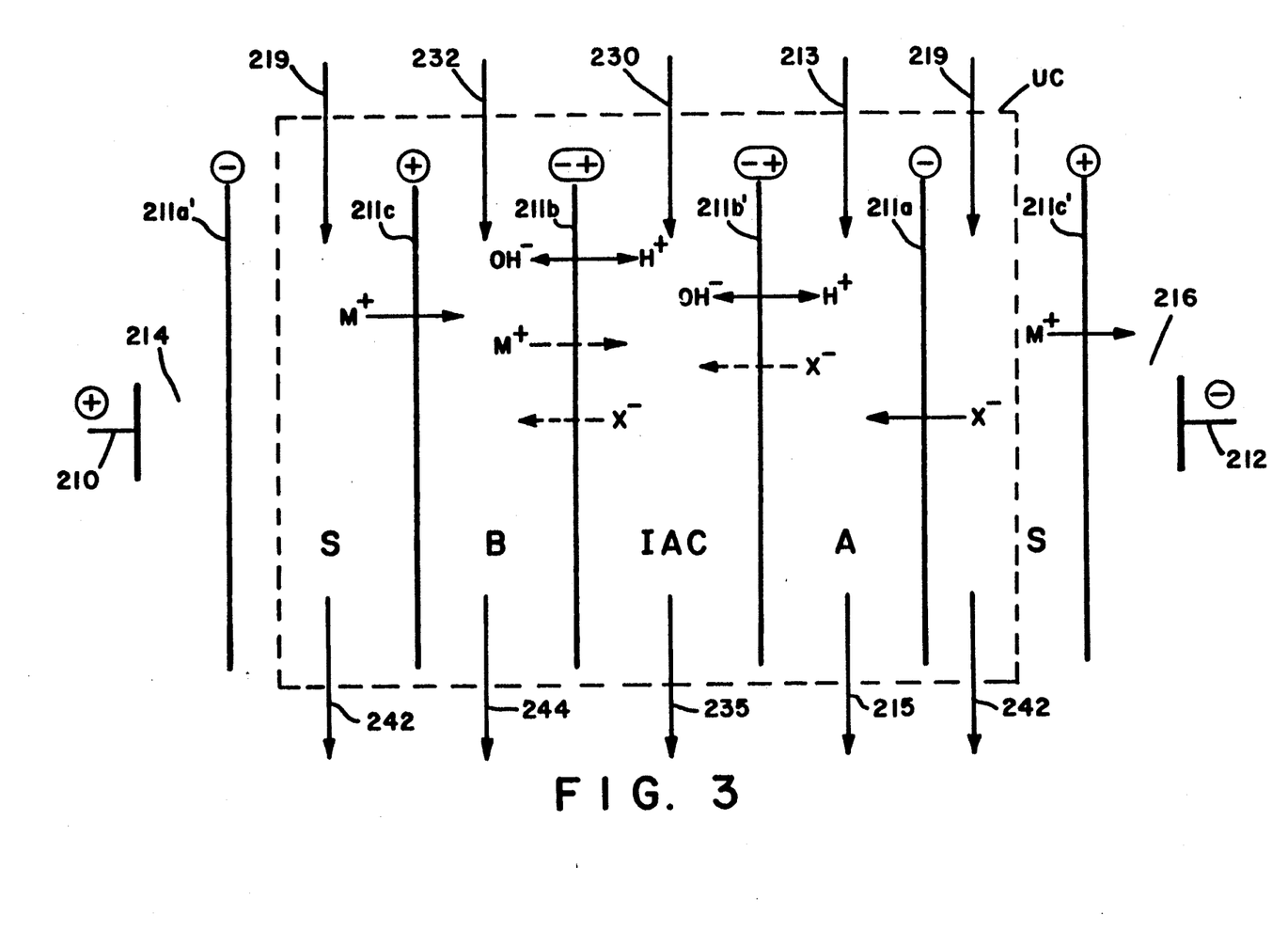
FIG. 3 is a schematic drawing of a unit cell of an alternate embodiment of the present invention useful for generating acid with improved purity and a separate base stream.

FIG. 3 is a construction of an alternate embodiment of an apparatus useful to prepare acid having improved purity, as well as a base product stream. The apparatus contains two adjacent bipolar membranes 211$b$ and 211$b'$. There is an intermediate acid compartment (IAC) between the two bipolar membranes. Each bipolar membrane has a cation layer (+) and an anion layer (−). The bipolar membranes are positioned so that the anion selective layers (−) face anode 210. Adjacent to the cation side of the bipolar membrane 211b' is an anion membrane 211a. Adjacent to the anion selective layer (−) of the bipolar membrane 211b, facing away from 211b', there is a cation membrane 211c. Membranes 211c, 211b, 211b' and 211a (and their associated compartments), in series, comprise the unit cell (UC) illustrated in FIG. 3.

An acid product compartment (A) is between the anion membrane 211a and the cation layer (+) of bipolar membrane 211b'. There is a salt compartment (S) between anion membrane 211a of the unit cell (UC) and the cation membrane 211c' of an adjacent cell (or a cation membrane next to the cathode compartment). Intermediate acid compartment (IAC) is between the anion layer of bipolar membrane 211b' and the cation layer (+) of bipolar membrane 211b. Base product compartment (B) is between the anion layer (−) of bipolar membrane 211b and cation membrane 211c. On the opposite side of cation membrane 211c there is a salt compartment (S) bounded by cation membrane 211c and anion membrane 211a'. At the ends of the stack are an anode 210 and a cathode 212, an anolyte compartment 214 and a catholyte compartment 216.

The apparatus of FIG. 3 is useful to electrodialytically generate acid having improved purity. Aqueous solutions of salt are fed via streams 219 to salt compartments (S). Stream 213 comprising water is fed to acid product compartment (A) and stream 232 comprising water is fed to base product compartment (B). An aqueous stream, preferably comprising acid, is fed to intermediate acid compartment (IAC) via stream 230. A spent salt solution is removed from salt compartments (S) via lines 242. An aqueous base solution is removed from base compartment (B) as stream 244. A stream comprising water and salt is removed from intermediate acid compartment (IAC) via line 235. A stream of acid with improved purity is removed from acid product compartment (A) via line 215.

The transport of ions in the apparatus illustrated in FIG. 3 is similar to that described above with reference to FIG. 2. The addition of the cation membranes permits the salt and base to be kept in separate salt and base compartments. Cations from the salt compartment (S) pass across the cation membrane 211c into the base compartment (B). The base compartment (B) also has hydroxyl ions entering from bipolar membranes such as bipolar membrane 211b. The metal and hydroxyl ions form base in the base compartment (B). The salt compartment (S) is thereby depleted of cations. This results in a depleted salt stream 242, a base product stream 244, intermediate acid compartment (IAC) product stream 235 and an acid product stream 215 having improved purity.

Figure 4:
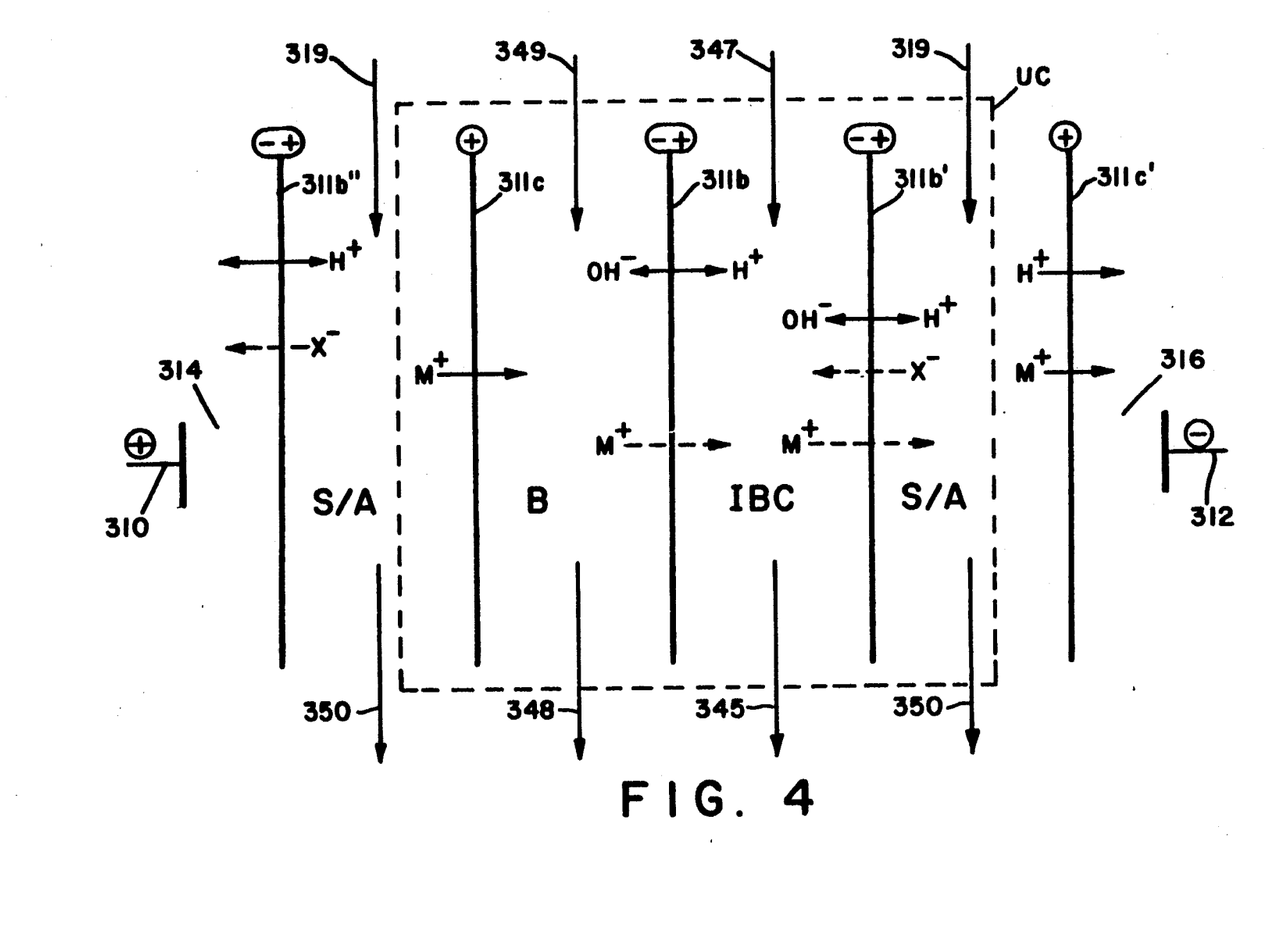
FIG. 4 is a schematic drawing of a unit cell of the present invention useful for generating base with improved purity.
Figure 5:
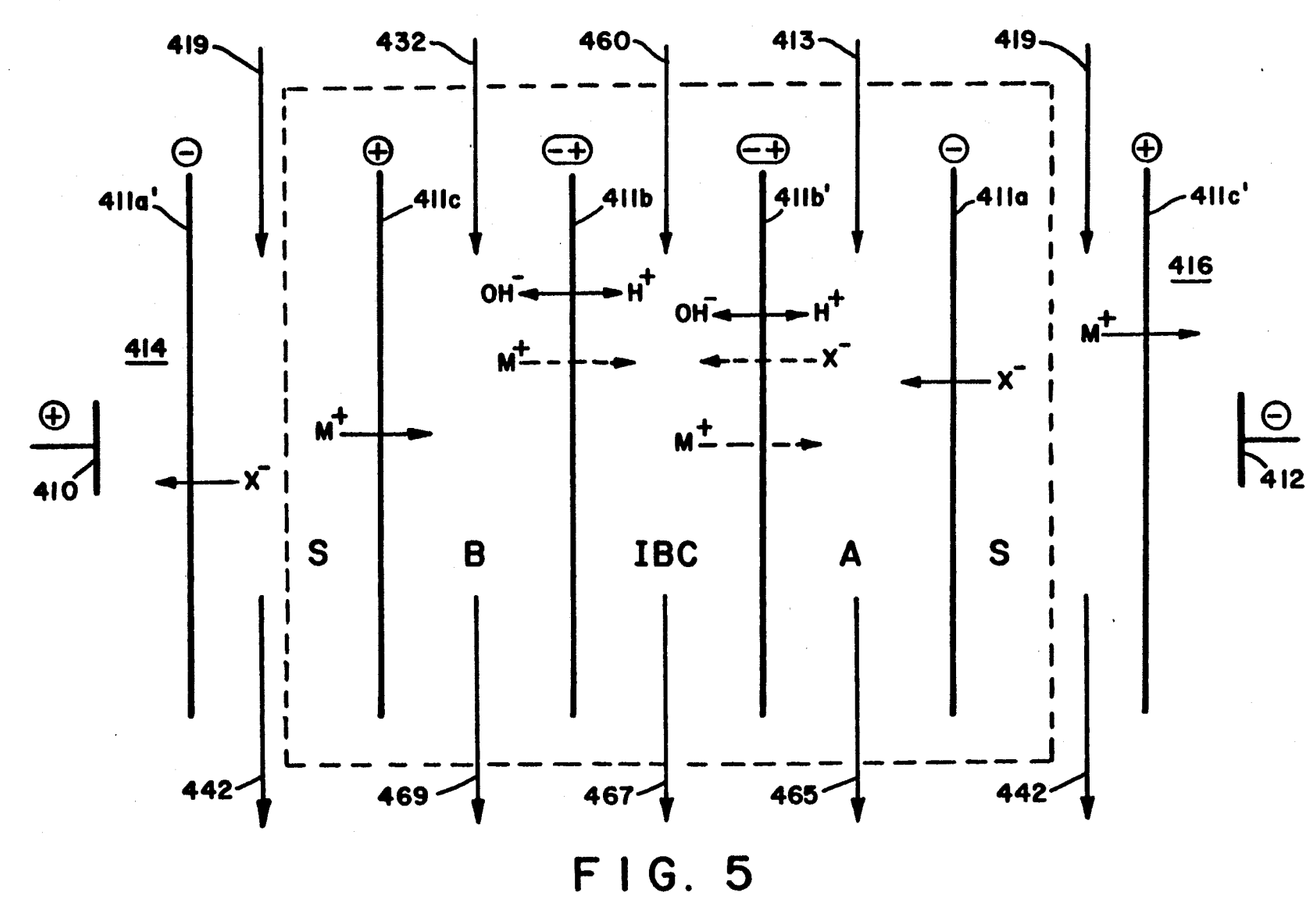
FIG. 5 is a schematic drawing of a unit cell of an alternate embodiment of the present invention useful for generating base with improved purity and a separate acid stream.

FIGS. 4 and 5 illustrate analogous apparatus, to FIGS. 2 and 3 respectively, for attaining base having improved purity via the electrodialytic treatment of an aqueous salt solution.

FIG. 4 illustrates a unit cell (UC) for an apparatus useful to generate base having improved purity by electrodialytically treating an aqueous salt solution. The apparatus comprises an anode 310 and cathode 312. There is an anolyte compartment 314 between the anode and at least one and preferably at least two unit cells. There is a catholyte compartment 316 between the cathode 312 and the at least two unit cells.

Each unit cell comprises at least two means for splitting water, preferably bipolar membranes 311b and 311b', which are in series and adjacent to each other. Each bipolar membrane has a cation layer (+) and an anion layer (−). The cation layers face the cathode 312 and the anion layers face the anode 310. The bipolar membranes are adjacent to each other, there being an intermediate base compartment (IBC) between them. Adjacent to the cation layer (+) of the bipolar membrane 311b' nearest the cathode there is a cation membrane 311c' which can be part of an adjacent unit cell. Salt feed compartment (salt/acid compartment S/A) is between cation membrane 311c' and bipolar membrane 311b'. There is another cation membrane 311c adjacent to the anion layer (−) of bipolar membrane 311b on the side opposite from 311b'. Base product compartment (B) separates cation membrane 311c and bipolar membrane 311b'. Adjacent to cation membrane 311c on the side opposite of base compartment (B) is a salt/acid compartment (S/A). The salt/acid compartment (S/A) is defined by the cation membrane 311c and bipolar membrane 311b" of an adjacent unit cell.

A salt feed stream 319 is fed into the salt/acid (S/A) compartments. An aqueous fluid is added via line 349 to base product compartment (B). An aqueous stream preferably comprising a base is fed via stream 347 into intermediate base compartment (IBC). When the electric field is applied across the cell via the anode 310 and cathode 312, water is split at bipolar membranes resulting in OH− entering the intermediate base compartment (IBC) and the base compartment (B). Hydrogen ions (H+) formed by the bipolar membranes enter the intermediate base compartment (IBC) and the salt/acid compartment (S/A). Cations (M+) migrate across the cation membranes towards the cathode 312. Because bipolar membrane 311b' is not perfectly selective, some anions (X−) migrate from the salt/acid (S/A) compartment toward the base product compartment (B). The anions (X−) leaking across the bipolar membrane 311b' enter the intermediate base compartment (IBC). The concentration of anions (X−) in compartment (IBC) can be controlled by the concentration (i.e., presence of base), and/or the rate of make-up in stream 347 and withdrawal in stream 345. The feed rate and composition of stream 347 can be used to assure that there is no precipitation in the (IBC), and that the flux of anions across the membrane 311b to the base compartment (B) is minimized. Acidified salt is removed via line 350 and pure base is removed via line 348.

FIG. 5 represents an alternate embodiment, which is an apparatus useful to produce a base product stream having improved purity as well as an acid product stream from an aqueous salt solution. The apparatus of FIG. 5 is identical to that of FIG. 3. Reference characters of FIG. 5 for corresponding elements in FIG. 3 have 200 added. The intermediate compartment is the intermediate base compartment (IBC).

In operation, rather than feeding an aqueous stream comprising acid to an intermediate acid compartment (A) as in FIG. 3, an aqueous stream comprising a base is fed to intermediate base compartment (IBC). Passage of a direct current causes anions (X−) to migrate toward the anode 410 and cations (M+) to migrate toward the cathode 412. In the intermediate base compartment (IBC) the concentration of anions (X−) can be controlled by adjusting the rate of addition of stream 460 and withdrawal in stream 467. By keeping the concentration of (X−) anions in (IBC) low, their leakage from intermediate base compartment (IBC) into pure base product compartment (B) can be reduced. Pure base is removed via line 469. Salt and base are removed from intermediate base compartment (IBC) via stream 467, and acid is removed from the acid compartment (A) via stream 465.

Figure 6:
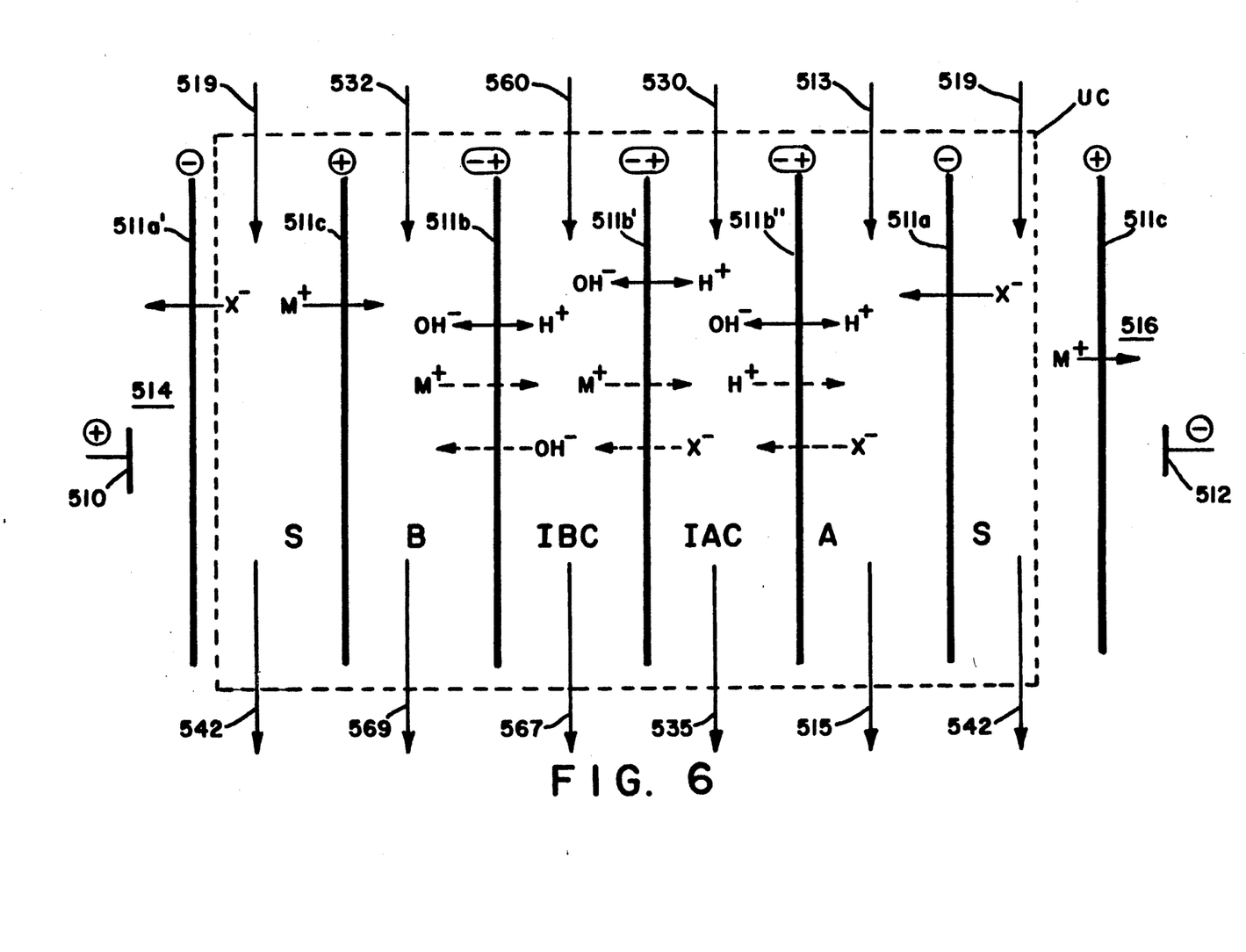
FIG. 6 is a schematic drawing of a unit cell of an alternate embodiment of the present invention useful for generating both acid and base with improved purity.

FIG. 6 represents an embodiment of the present invention wherein there are at least three bipolar membranes in series. In accordance with this embodiment, a unit cell is used which has an intermediate acid compartment (IAC) and an intermediate base compartment (IBC) in order to result in both acid and base streams with improved purity by electrodialytically treating an aqueous salt stream. Reference characters for common elements of the previous embodiments, are the same for common elements beginning with "500".

The embodiment of FIG. 6 is similar to FIGS. 3 and 5, except that there are at least three bipolar membranes, 511$b$, 511$b'$ and 511$b''$. The bipolar membranes are adjacent and in series with the cation layers (+) facing the cathode 512 and the anion layers (−) facing the anode 510. On the anion layer (−) side of the first bipolar membrane 511$b$ nearest the anode 510, there is a pure base product compartment (B) which is bounded by cation membrane 511$c$. Between the cation layer (+) of bipolar membrane 511$b$ and the anion layer (−) of the second bipolar membrane 511$b'$ there is an intermediate base compartment (IBC). Between the cation layer (+) side of 511$b'$ and anion layer (−) of the third bipolar membrane 511$b''$ there is an intermediate acid compartment (IAC). Between the cation layer (+) of bipolar membrane 511$b''$ and anion membrane 511$a$ there is a pure acid product compartment (A). There are salt compartments (S) between the anion membranes and cation membranes, i.e., 511$a$ and 511$c'$, and 511$a'$ and 511$c$.

In operation, an aqueous salt feed stream 519 is fed to salt compartments (S). Solutions comprising water are fed via stream 532 to base compartment (B) and stream 513 into acid compartment (A). A solution comprising base is fed to intermediate base compartment (IBC) via line 560, and a solution comprising acid is fed to intermediate acid compartment (IAC) via line 530. Upon application of an electrical potential across the electrodes, cations (M$^+$) tend to migrate toward the cathode 512 and anions (X$^-$) tend to migrate toward the anode 510. Water is split to form (OH$^-$) and (H$^+$) at the bipolar membranes and acid forms from the anions and hydrogen ions entering the acid compartment (A) and base forms from the cations and hydroxyl ions entering base compartment (B). There is a leakage of cations (M$^+$) across bipolar membranes 511$b$ and 511$b'$ and there is leakage of anions (X$^-$) across bipolar membranes 511$b''$ and 511$b'$. A basic aqueous solution fed to (IBC), and an acidic solution fed to (IAC) help to prevent the migration of cations (M$^+$) to the pure acid compartment (A) and anions (X$^-$) to pure base compartment (B). There is a leakage of cations (M$^+$) across all three bipolar membranes, 511$b$ and 511$b'$, and 511$b''$, but the leakage across 511$b''$ can be maintained at a lower value than across the other membranes since a low concentration of (M$^+$) cations in compartment (IAC) can be maintained by adjusting the feed rate and withdrawal rates to the compartment in streams 530 and 535. This results in a purer acid product being withdrawn in stream 515 than would result if the base (B) or intermediate base (IBC) compartments were next to the acid compartment (A). Likewise, there is a leakage of anions (X$^-$) across all three bipolar membranes, 511$b$, 511$b'$, and 511$b''$, but the leakage of anions (X$^-$) across 511$b$ can be maintained at a lower value than across the other membranes since a low concentration of (X$^-$) anions in compartment (IBC) can be maintained by adjusting the feed rate and withdrawal rates to the compartment in streams 560 and 567. This results in a purer base product being withdrawn in stream 569 than would result if the acid (A) or intermediate acid (IAC) compartments were next to the base compartment (B).

Useful bipolar membranes comprise a cation layer (+) and an anion layer (−). The cation layer permits the cations to pass through and the anion layer permits anions to pass through. The cation layer is a barrier to anions and the anion layer is a barrier to cations. Useful cation membranes permit cations to pass through and are a barrier to anions, and similarly useful anion membranes permit anions to pass through and are a barrier to cations. The bipolar membrane is effective to split water. The effectiveness of the bipolar membrane is indicated by the current efficiency using a one molar sodium chloride solution tested in accordance with the experimental procedure set forth in Chlanda et al., *Water Splitting Efficiency of Bipolar Membranes*, AIChE Symposium Series 1988, hereby incorporated by reference. The current efficiency is preferably at least 50%, more preferably at least 75%, and most preferably at least 90%.

Examples of bipolar membranes which are particularly useful include those described in U.S. Pat. No. 2,829,095 to Oda, et al. (which has reference to water splitting generally), in U.S. Pat. No. 4,024,043 (which describes a single film bipolar membrane), and in U.S. Pat. No. 4,116,889 (which describes a cast bipolar membrane and is most preferred) and U.S. Pat. No. 4,082,835. However, any means capable of splitting water into hydrogen and hydroxyl ions may be used; for example, spaced apart anion and cation membranes having water disposed therebetween. Bipolar membranes useful in the present invention include "neutral" bipolar membranes as defined in U.S. Pat. No. 4,806,219 hereby incorporated by reference. Such membranes comprise an anion-exchange resin layer and a cation-exchange resin layer having an equivalent ratio of the anion-exchange group to the cation-exchange group in the membrane from 0.6:1 to 1:0.6, preferably from 0.9:1 to 1:0.9.

Useful cation membranes employed can be moderately acidic (e.g., phosphonic group-containing) or strongly acidic (e.g., sulfonic group containing) cation permselective membranes having a low resistance at the pH at which they are employed. Particularly useful cation membranes are DuPont's Nafion ® 110 and 324 cation membranes. More preferably, the cation membranes are of the composition and construction as disclosed in U.S. Pat. No. 4,738,764, to Chlanda, et al. and commonly assigned.

Useful anion membranes include strongly, moderately, or weakly basic anion membranes. Commercially available anion membranes include those from Ionics, Inc., Watertown, Mass. (sold as Ionics 204-UZL-386 anion membrane), or from Asahi Glass Co. (sold under the trade name Selemion ® AMV AAV, ASV anion permselective membranes).

In accordance with the apparatus and method of the present invention a wide variety of soluble salts can be electrodialytically treated to form acids and bases. The salt cations include mono, di and trivalent metallic and non-metallic cation including ammonium. The anions include monovalent anions such as halides, divalent anions, such as sulfates, trivalent anions, such as phosphates and mixtures thereof. Typical salts which can be treated include NaCl, sodium formate, sodium acetate, sodium citrate, $NH_4Cl$, $Na_2SO_4$, $NaHCO_3$, $NaNO_3$, $NH_4NO_3$, $Na_3PO_4$, $(NH_4)_2SO_4$, KF, trimethylammonium chloride and lysine hydrochloride. Mixtures of salts can also be treated.

The salt feed can be at concentrations up to saturation, preferably, from 0.1 molar to saturation concentration, and are typically 0.5 molar or more. Preferably, the concentration of the purified acid or base in the product stream is 0.5N to 5N and most preferably, 1 to 3N.

Useful operating temperatures of from 0° C. to 100° C. are possible if the stability of the membranes and the solubility of the solution constituents permit. Generally, membrane life is longer at lower temperatures and power consumption will be lower at higher temperatures. Preferred operating temperatures are between 25° and 60° C., and more preferably, from 35° to 50° C. In the case of sulfuric acid, a temperature greater than 45° C. is most preferred.

The current passed through the water splitter is direct current of a voltage dictated by design and performance characteristics readily apparent to the skilled artisan and/or determined by routine experimentation. Current densities between 25 and 300 amps per square foot (between 28 and 330 milliamps per square centimeter) are preferred; and current densities between 50 and 150 amps per square foot (between 55 and 165 milliamps per square centimeter) are more preferred. Higher or lower current densities can be used for certain specific applications.

In electrodialysis and related processes, generally the flow rate through the stack is higher than the input rate of fresh feed. The stack is operated in a recycle mode with the recycle feed being obtained from a recycle reservoir. In this way, one can determine and adjust the net input rate to obtain the desired composition changes for the entire system even through the concentration change in one pass through the stack may be small. Feed to each recycle loop of the system and product removal may be made continuously (steady state operation) or periodically (batch operation).

The following examples illustrate the practice of the present invention. The example should not be construed as limiting the invention to anything less than that which is disclosed or which would have been obvious to one of ordinary skill in the art therefrom. Percents and parts are by weight unless otherwise indicated.

EXAMPLE I

Figure 7A:
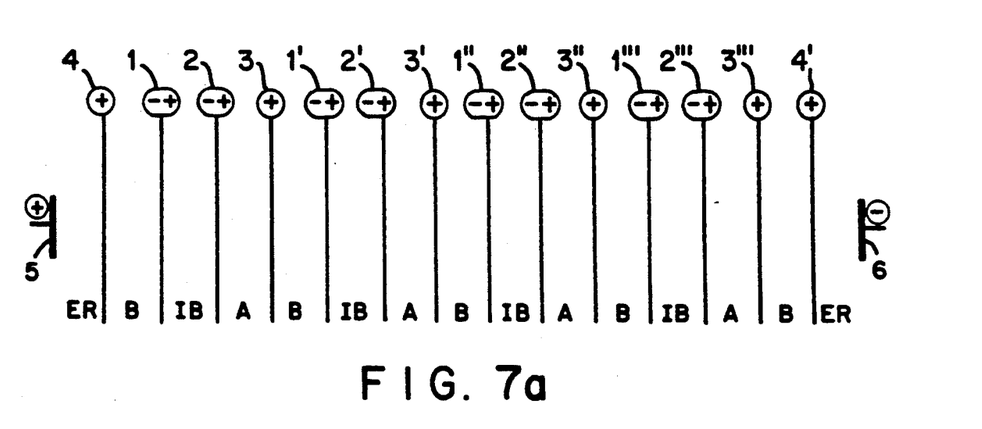
FIG. 7A is a schematic drawing of an electrodialytic stack used in the Example 1.

A laboratory scale electrodialysis stack was assembled as shown schematically in FIG. 7a between a nickel anode 5 and stainless steel cathode 6 using eight bipolar membranes (−+) prepared according to U.S. Pat. No. 4,766,161, four cation membranes (+) prepared according to U.S. Pat. No. 4,738,764 and two fluorinated cation membranes (+) 4, 4′ Nafion 324 (DuPont) which were placed closest to the electrodes. The membranes were separated from one another by 0.13 cm thick gaskets which were punched to form three sets of internal manifolds and three sets of solution compartments labeled B, IB and A in FIG. 7a. The electrode rinse compartments, labeled ER between the electrodes and Nafion membranes were externally manifolded. The exposed area of each membrane in the cell was about 23 $cm^2$. A stack of four unit cells of the type described with reference to FIG. 4 was thus formed.

Figure 7B:
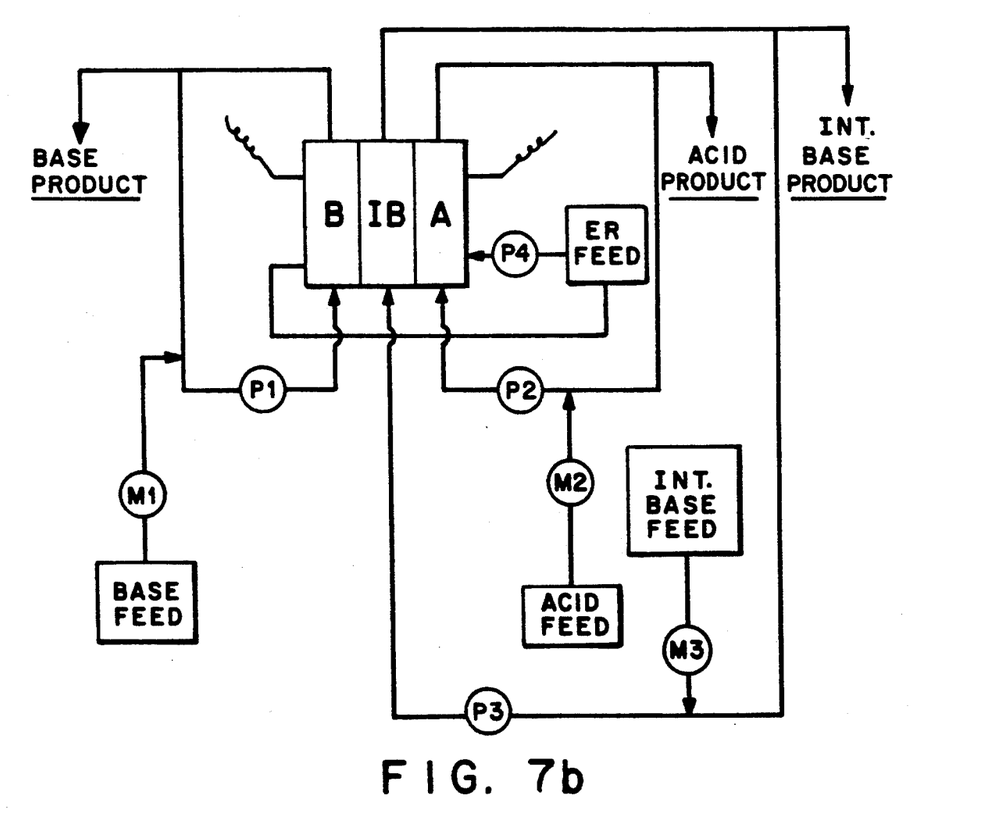
FIG. 7B is a schematic drawing of a diagram of the system used in the Example 1.

The stack was placed in the system shown schematically in FIG. 7b in order to carry out the water splitting process. Four pumps (P1-P4) were used to recirculate solution to the A, B, IB and ER compartments at a rate of about 1 L/min. The recirculation loops for the A, B, and IB compartments were fed at constant rates from feed reservoirs labeled Base Feed, Acid Feed and Int. (Intermediate) Base Feed in the diagram using metering pumps M1-M3. The addition of solution to the recirculation loops caused an overflow of solution at the points labeled Base Product, Acid Product and Int. Base Product.

To begin the experiment, the recirculation loops, each with a volume of about 100 mL, were charged with solution as follows: B—15% NaOH+1% sodium formate (NaFm) A—5% NaFm+15% formic acid (HFm); IB—2.2% NaOH+1% NaFm. Solution was placed in the feed reservoirs as follows: Base Feed—water; Acid Feed—300 g/L NaFm; Int. Base Feed—1N NaOH+0.70 g/L NaFm, ER Feed 1N NaOH. A direct current of 2.0 Amps, feeds at about 1.5 mL/min to B, 1.0 mL/min to IB and 1.8 mL/min to A, and a timer were started to begin the experiment. Samples of the overflowed Acid, Base, and Int. Base Products were collected over timed intervals and analyzed for formic acid or NaOH by titration to pH 8.5 with standard acid and base and for formate ion by ion chromatography. The results are shown in Table I.

TABLE I

| TIME INTERVAL (MIN) | ACID PRODUCT | | BASE PRODUCT | | | INT. BASE PRODUCT | | |
|---|---|---|---|---|---|---|---|---|
| | PRDT. RATE (g/min) | CONC. HFm (meq/g) | PRDT. RATE (g/min) | CONC. NaOH (meq/g) | NaFm (meq/g) | PRDT. RATE (g/min) | CONC. NaOH (meq/g) | NaFm (meq/g) |
| 47–70 | 1.84 | 2.35 | 1.59 | 2.80 | 0.072 | 1.02 | 0.68 | 0.138 |
| 122–145 | 1.88 | 2.13 | 1.55 | 2.59 | 0.038 | 1.03 | 0.87 | 0.144 |
| 184–207 | 1.93 | 2.10 | 1.55 | 2.56 | 0.026 | 0.97 | 0.93 | 0.145 |
| 281–307 | 1.79 | 2.09 | 1.52 | 2.56 | 0.019 | 0.95 | 0.95 | 0.141 |

After the first 100 minutes the temperature was 38°–39° C. and the applied potential 15.1 volts. The system was close to steady state operation at the end of the run as indicated by the small changes in the solution concentrations compared to the previous interval. Based on the overflow rates and concentrations, the current efficiency for acid production was 0.75 and for base production 0.78. The base produced during the last interval had a NaOH/NaFm mole ratio of 124.

COMPARATIVE EXAMPLE

The four bipolar membranes corresponding to those labeled 2 to 2‴ and the gaskets forming the IB compartments were removed from the stack, forming a conventional 2-compartment water splitting stack. The same apparatus was used to run the water splitting experiment except that the IB compartments and associated equipment were not present. The A loop was charged with 15% HFm and 5% NaFm and the B loop with 10% NaOH (without NaFm). The acid Feed reservoir was supplied with 300 g/L (NaFm) and the Base Feed reservoir with water. The experiment was run and samples analyzed as for the Example with the results shown in Table II.

TABLE II

| TIME INTERVAL (MIN) | ACID PRODUCT | | BASE PRODUCT | | |
|---|---|---|---|---|---|
| | PRDT. RATE (g/min) | CONC. HFm (meq/g) | PRDT. RATE (g/min) | CONC NaOH (meq/g) | NaFm (meq/g) |
| 17–40 | 1.73 | 2.64 | 1.42 | 2.21 | 0.070 |
| 87–105 | 1.80 | 2.32 | 1.49 | 2.42 | 0.125 |
| 170–191 | 1.85 | 2.17 | 1.51 | 2.53 | 0.139 |
| 147–271 | 1.85 | 2.13 | 1.49 | 2.57 | 0.140 |

The temperature (38° C.) and the stack potential (11.2 volts) were stable after the first 100 minutes. Based on the production rate of acid, the calculated current efficiency was 0.79 and based on base 0.77. The mole ratio of NaOH/NaFm in the base collected during the last interval was 18. Thus, the NaOH produced by this prior art method is much less pure than the base produced by the method and apparatus of this invention.

While exemplary embodiments of the invention have been described, the true scope of the invention is to be determined from the following claims.

What is claimed is:

1. An electrodialysis apparatus comprising at least one unit cell comprising:
   at least two adjacent, serially aligned electrodialytic means for splitting water, separated by an intermediate compartment disposed between said adjacent means for splitting water;
   at least one ion selective membrane serially aligned with and adjacent to at least one of the means for splitting water, there being a product compartment between the ion selective membrane and the means for splitting water; and
   an aqueous salt solution feed compartment serially aligned with and adjacent to the product compartment with the ion selective membrane therebetween.

2. The apparatus as recited in claim 1 further comprising a means to supply an electrical potential across said cell.

3. The apparatus as recited in claim 1 wherein the ion selective membrane is an anion exchange membrane.

4. The appratus as recited in claim 1 wherein the ion selective membrane is an cation exchange membrane.

5. The apparatus as recited in claim 1 wherein the means for splitting water is a bipolar membrane having an anion selective layer and a cation selective layer.

6. The apparatus as recited in claim 5 wherein the at least one ion selective membrane is selected from a cation selective membrane and an anion selective membrane.

7. The apparatus as recited in claim 5 wherein the at least two adjacent serially aligned bipolar membranes in each cell comprise in series a first bipolar membrane and a last bipolar membrane aligned such that the cation layer of the first bipolar membrane and the anion layer of said last bipolar membrane border said intermediate compartment; the unit cell further comprising:
   at least one cation selective membrane serially aligned with and adjacent to a first means for splitting water there being a base product compartment between said cation selective membrane and the first bipolar membrane;
   at least one anion selective membrane serially aligned with and adjacent to, said last means for splitting water, there being an acid product compartment between said anion selective membrane and the last means for splitting water; and
   at least a portion of an aqueous salt solution feed compartment adjacent each product compartment with the ion selective membrane therebetween.

8. A unit cell comprising:
   at least two adjacent serially aligned electrodialytic means for splitting water, separated by an intermediate compartment disposed between the adjacent means for splitting water;
   at least one ion selective membrane serially aligned with and adjacent to at least one of the means for splitting water, there being a product compartment between said ion selective membrane and the means for splitting water; and
   an aqueous salt solution feed compartment serially aligned with and adjacent to the product compartment with the ion selective membrane therebetween.

9. The unit cell as recited in claim 8 wherein the ion selective membrane is an anion selective membrane.

10. The unit cell as recited in claim 8 wherein the ion selective means is a cation selective membrane.

11. The unit cell is recited in claim 8 wherein the means for splitting water is a bipolar membrane.

12. The unit cell as recited in claim 11 wherein the at least one ion selective membrane is selected from an anion exchange membrane and a cation exchange membrane.

13. A unit cell comprising:
   at least two adjacent serially aligned electrodialytic means for splitting water, each having a cation selective portion and an anion selective portion, there being an intermediate compartment between adjacent means for splitting water, the at least two serially aligned means to split water comprise in series a first means to split water and a last means to split water, aligned such that the cation selective portion of the first means and the anion selective portion of the second means border the intermediate compartment;
   at least one cation selective membrane serially aligned with and adjacent to the first means for splitting water, there being a base product compartment between the cation selective means and the means for splitting water;
   at least a portion of an aqueous salt solution feed compartment serially aligned with and adjacent the base product compartment with the cation selective membrane therebetween;
   at least one anion selective membrane serially aligned with and adjacent to a last means for splitting water, there being an acid product compartment between said anion selective membrane and the means for splitting water; and
   at least a portion of an aqueous salt solution feed compartment serially aligned with and adjacent to the acid product compartment with the anion selective means therebetween.

14. The unit cell as recited in claim 13 wherein the means for splitting water is a bipolar membrane.

15. The unit cell as recited in claim 14 wherein there are two bipolar membranes.

16. The unit cell as recited in claim 15 wherein the anion selective means is an anion exchange membrane and the cation selective means is an cation exchange membrane.

17. The unit cell as recited in claim 13 wherein there are three serially aligned bipolar membranes.

18. A method for generating acid having improved purity from an aqueous salt solution using an electrodialytic apparatus comprising at least one unit cell comprising:
- at least two serially aligned electrodialytic means for splitting water, there being an intermediate compartment between adjacent means;
- at least one anion selective membrane adjacent to the at least one of the means for splitting water nearest the cathode, there being a product compartment between said anion selective membrane and the means for splitting water; and
- a feed compartment adjacent to the anion selective membrane opposite the product compartment;

comprising the steps of:
- feeding the aqueous salt solutions being fed to the feed compartments;
- feeding an aqueous stream optionally comprising an acid to the intermediate compartment;
- feeding an aqueous stream to the product compartment;
- applying a sufficient electrical potential across said cell to a cause introduction of ($H^+$) from the means for splitting water into the product compartment, and transport of anions from the feed compartment into the product compartment to form acid in the product compartment;
- removing the acid from the product compartment; and
- removing the intermediate product from the intermediate compartment.

19. The method as recited in claim 18 wherein the at least two serially aligned means to split water in each cell comprise in series a first means to split water and a last means to split water; the unit cell further comprising:
- at least one cation selective membrane adjacent to the means for splitting water, there being a base product compartment between said cation selective means and the means for splitting water; and the method further comprising:
- feeding an aqueous solution to the base product compartment; and
- removing an aqueous base solution from the base product compartment.

20. A method for generating base having improved purity from an aqueous salt solution using an electrodialytic apparatus comprising at least one cell comprising:
- at least two serially aligned electrodialytic adjacent means for splitting water, there being an intermediate compartment between adjacent means;
- at least one cation selective membrane adjacent to the at least one of the means for splitting water nearest the anode, there being a product compartment between said cation selective means and the means for splitting water; and
- a feed compartment adjacent to the cation selective membrane opposite the product compartment;

comprising the steps of:
- feeding the aqueous salt solution to the feed compartments;
- feeding an aqueous stream optionally comprising a base to the intermediate compartment;
- feeding an aqueous stream to the product compartment;
- applying a sufficient electrical potential across the cells to a cause introduction of ($OH^-$) from the means for splitting water into the product compartment, and transport of cations from the feed compartment into the product compartment to form base in the product compartment;
- removing the base from the product compartment; and
- removing the resultant intermediate product from the intermediate compartment.

21. The method as recited in claim 20 wherein the at least two serially aligned means to split water in each cell comprise in series a first means to split water and a last means to split water, the unit cell further comprising:
- at least one anion selective means adjacent to a last means for splitting water, there being an acid product compartment between said anion selective means and the means for splitting water; and the method further comprising:
- feeding an aqueous solution to the acid product compartment; and
- removing an aqueous acid solution from the acid product compartment.

22. The method as recited in claim 21 in which the aqueous salt fed is sodium formate and the aqueous acid product is ferric acid.

23. The method as recited in claim 20 wherein the unit cell comprises three bipolar membranes, there being an acid intermediate compartment adjacent to the acid product compartment, and a base intermediate compartment adjacent to the base product compartment.

24. The method as recited in claim 23 further comprising the steps of:
- feeding an aqueous stream comprising a base to the base intermediate compartment;
- feeding an aqueous stream comprising a acid to the acid intermediate compartment;
- removing acid from the acid product compartment, the acid having improved purity;
- removing base from the base product compartment, the base having improved purity;
- removing a resultant intermediate product comprising base and salt from the base intermediate compartment; and
- removing a resultant intermediate product comprising acid and salt from the acid intermediate compartment.

* * * * *